Feb. 22, 1927.
P. R. HUNTER
1,618,957
SUPPORT FOR CONVEYER BELTS
Filed July 1, 1926   2 Sheets-Sheet 2
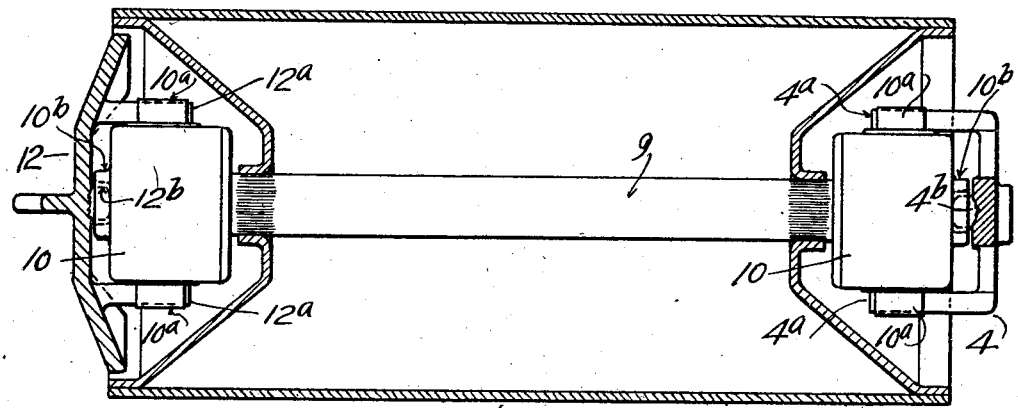
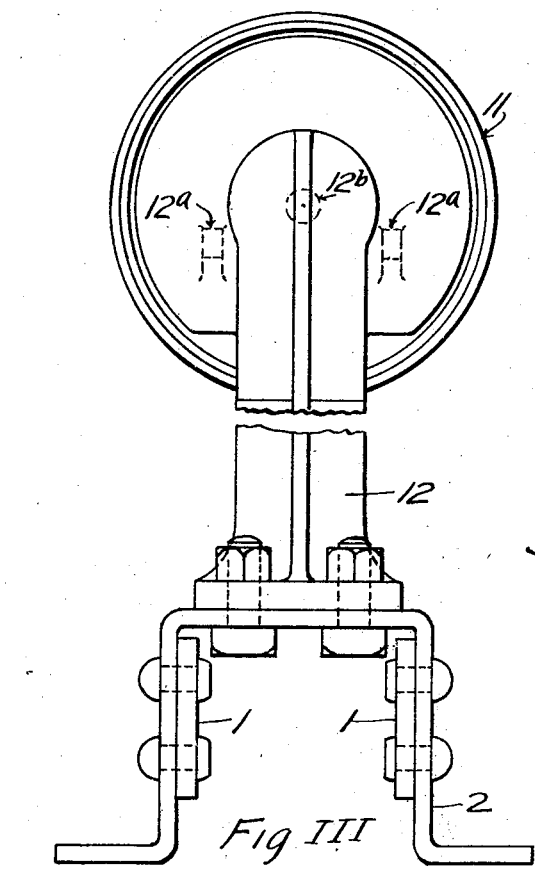
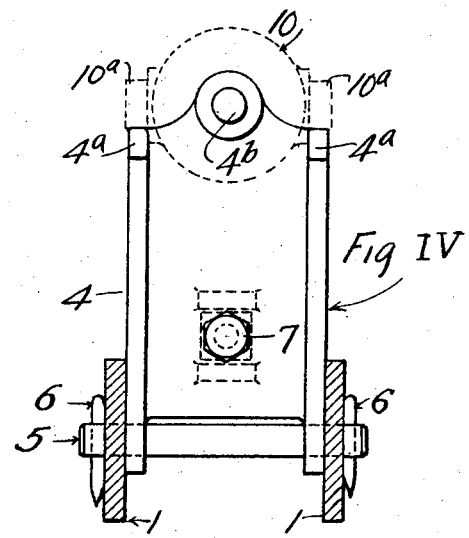
INVENTOR:-
Pierre R. Hunter
By George Ottung.
His Attorney.
WITNESS:
J. P. Sipps Patented Feb. 22, 1927.

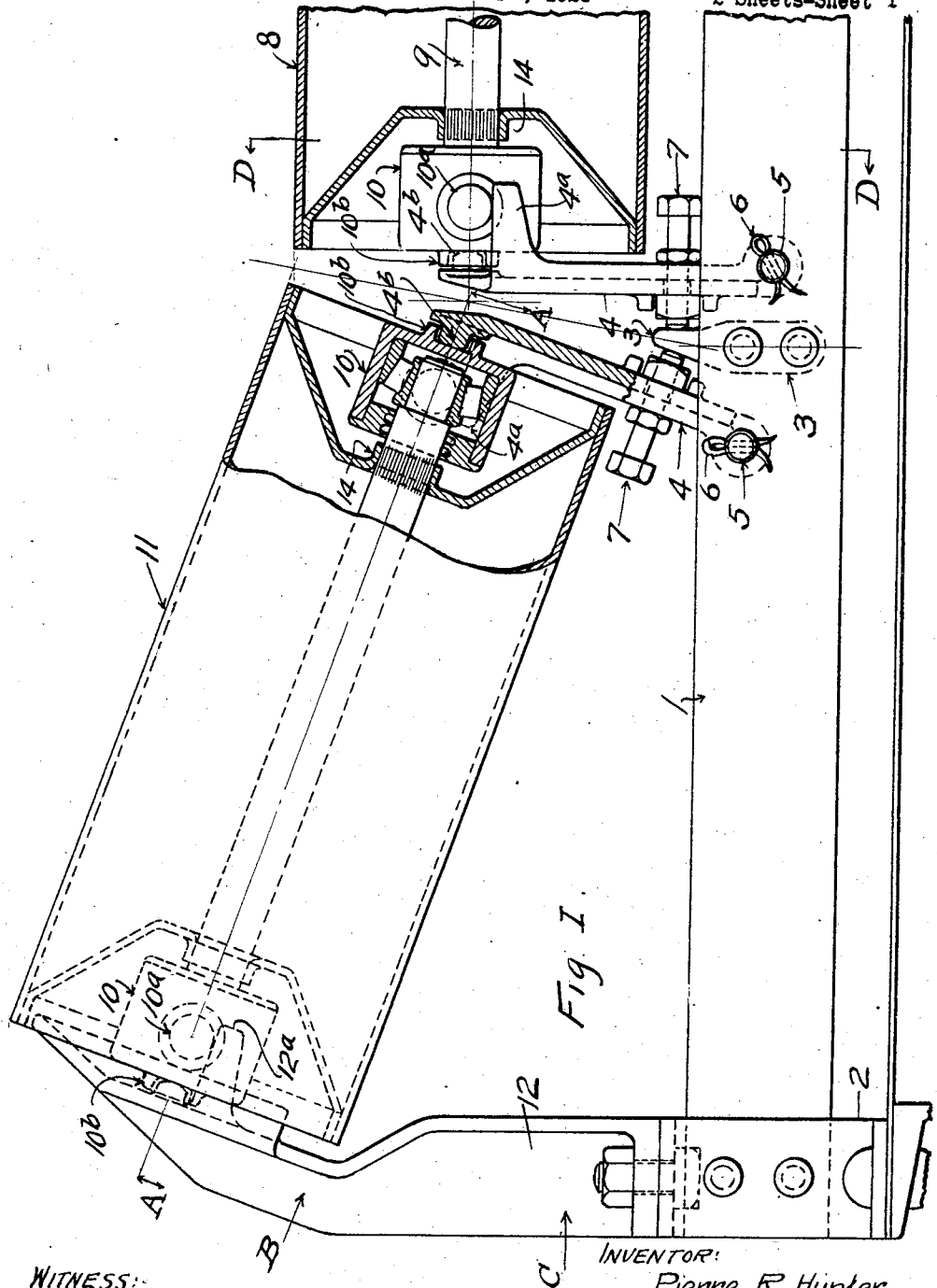

1,618,957

UNITED STATES PATENT OFFICE.

PIERRE R. HUNTER, OF LAKEWOOD, OHIO, ASSIGNOR TO THE BROWN HOISTING MACHINERY COMPANY, OF CLEVELAND, OHIO, A CORPORATION.

SUPPORT FOR CONVEYER BELTS.

Application filed July 1, 1926. Serial No. 119,933.

My invention is more particularly concerned with the manner of making up and supporting the idler members of the series customarily employed in conveyer belts, and its objects are to provide supports which not only can be produced at reduced costs, but when in their designed places are so related to other details of the belt system, to which they pertain, as to furnish a means whereby inaccuracies in roller alignments, that develop in use, may be quickly corrected.

In the drawings, Figure I is a side elevation of one end of a troughing unit with certain of its details shown in section. Figure II is a sectional view taken on the line A—A in Figure I. Figure III is a composite end view looking in the direction indicated by the arrows B and C in Figure I, and, Figure IV is a sectional view taken on the line D—D in Figure I.

In said illustrative drawings the troughing unit is assumed to consist of one horizontal and two inclined pulleys.

The main support for the unit comprises two spaced apart parallel bars 1, 1, horizontally arranged in upright positions, and riveted at their ends to suitable bases 2, 2. Resting upon, and firmly bolted to these bases, are standards, or brackets, 12, 12, to receive and carry the outer ends of inclined roller members 11, of a given unit in a belt supported system. The inner faces of the brackets 12, are provided with bearing supporting arms $12^a$, $12^a$, and bearing holding parts or bosses $12^b$. The inner ends of the inclined rollers 11, and both ends of the intermediate roller 8, are shown as adapted to be engaged and supported by brackets 4, 4. These brackets are located, in each case, at points between the bars 1, 1, equidistant from the center, or median line, of the trough unit, and are rotatably secured in their designed places by pins 5, 5, which freely pass through their lower ends and the adjacent bars 1, for the purpose. They are held in such relation by cotters 6, 6.

The brackets 4, 4, are provided with adjusting screw-bolts 7 near their lower ends, and with inwardly projecting bearing supports, or arms, $4^a$, $4^a$, at their upper ends. Upwardly extending projections or resistance pieces for said adjusting bolts (represented in the drawings by the parts 3) are located in suitable proximity to the same on the bars 1, and bosses $4^b$ similar to the bosses $12^b$, on the brackets 12, are located on the inner faces of the brackets 4—4, between the arms $4^a$.

In the invention, in the form illustrated by the drawings, all roller members are dished at their ends, for reasons that will be apparent. As a further detail, roller bearings 10, having supporting trunnions $10^a$ at each side, and adapted to be operatively engaged by the pulley shafts when all parts are assembled, are seated and rest on the bracket arms $4^a$ in each case. Roller bearings 10, with trunnions $10^a$—$10^a$, are similarly mounted on the arms $12^a$, of the brackets 12—12 that rest on the bases 2, 2. The outer ends, or faces, of the bearings 10, are provided with corresponding recesses $10^b$, $10^b$, which severally register with and admit the correlative parts or bosses $4^b$, and $12^b$, in the process of assembling a troughing unit, and thereby interlock with and hold the parts involved in their assembled relations.

In order to mount the horizontal roller 8 in its designed place with relation to the supporting bracket-arms $4^a$ and $12^a$, the shaft 9, which is of a length to protrude from the roller hubs 14 a suitable distance to meet and accommodate the roller bearings on said supporting arms, the adjusting bolts 7—7, are unscrewed to an extent that will permit the brackets 4—4 to be rotated, on their pins 5—5, until they incline outwardly a sufficient degree to allow the bearings 10—10 to pass by the bosses $4^b$, and be rested in place upon the arms $4^a$. The bolts 7 are then screwed against the projections 3, until the arms are thereby rotated inwardly and the bosses $4^b$ enter the recesses $10^b$ and contact with the bearing proper, in each case, and is brought into its operative place.

It will be obvious that any wear on the rollers in the bearing that develops in subsequent use, can instantly be taken up, and compensatingly adjusted, by a further screwing up of said bolts. As arranged in the drawings the bearings of the central rollers 8, are adjustable from either end of the same, but inasmuch as the supporting brackets 12—12, of the inclined rollers 11, are non-rotatable and firmly bolted to the fixed bases 2, the bearings on these brackets are only adjustable at the lower end of the roller supported by the rotatable brackets 4—4.

It is further plain that, although the central roller 8 is shown and described as being supported at each end by rotatably secured brackets, such as support the lower ends of the inclined rollers, the invention will equally function if but one of the brackets of such roller is non-rotatably attached to the unit.

Having thus described and illustrated my invention in a manner that will be fully understood by those familiar with the art, what I claim and wish to secure by Letters Patent, is:—

1. In troughing units for supporting conveyer belts having central horizontal roller-members, and auxiliary roller members at the ends thereof, with the axes of said members in the same plane, one with the other, and the axis of the auxiliary members at a predetermined inclination to the axis of the central roller-member, the combination of bracket supports for said members, extending upwardly a predetermined distance in each case, and severally located at the ends of said roller-members, the brackets at the outer ends of said auxiliary members being firmly secured to bases provided for the purpose, and the brackets at the inner or lower ends of said latter members, being rotatably connected to the fixed framework of said unit beneath, bearing seats on the inner faces of said brackets, bearings for the shafts of roller members seated thereon, and means for rotating said supporting brackets about their points of connection to the framework of said unit, and firmly holding the same at any given stage of the rotation, substantially as shown and described.

2. In troughing units for supporting conveyer belts having central horizontal roller members, and auxiliary roller members at the ends thereof, with the axes of said members in the same plane, one with the other, and the axis of the auxiliary members at a predetermined inclination to the axis of the central roller-member, the combination of bracket supports for said members extending upwardly a predetermined distance in each case, and severally located at the ends of said roller members, the brackets at the outer or upper ends of said auxiliary members being firmly secured to bases provided for the purpose, and the brackets at the inner or lower ends of the latter members being rotatably connected to the fixed framework of the unit beneath, bearing seats on the inner sides of the bracket supports, bearings for the shafts of the roller members seated thereon, means for interlocking said bearings and said supports next adjacent when brought into close contact by the reciprocation of said supports around their points of connection with said framework, together with means for reciprocating said supports accordingly, substantially as shown and described.

PIERRE R. HUNTER.